United States Patent [19]
Meyers et al.

[11] 3,883,160
[45] May 13, 1975

[54] TRAILER ANTI-JACKKNIFING DEVICE

[76] Inventors: William G. Meyers, R.R. 1, Gretna, Nebr. 68028; Arthur A. Dirks, 5357 N. 47th St., Omaha, Nebr. 68104

[22] Filed: Mar. 21, 1974

[21] Appl. No.: 453,364

[52] U.S. Cl. .............................................. 280/432
[51] Int. Cl. .......................................... B62d 53/08
[58] Field of Search ................ 280/432, 423 R, 415

[56] References Cited
UNITED STATES PATENTS

| | | | |
|---|---|---|---|
| 2,188,727 | 1/1940 | Soulis | 280/432 |
| 2,400,738 | 5/1946 | Brown | 280/432 |
| 2,959,429 | 11/1960 | Lavelle | 280/432 |
| 3,031,205 | 4/1962 | Fox | 280/432 |
| 3,556,559 | 1/1971 | Interisano | 280/432 X |
| 3,733,090 | 5/1973 | Keller | 280/432 |

Primary Examiner—Robert R. Song
Assistant Examiner—R. Schrecengost
Attorney, Agent, or Firm—George R. Nimmer

[57] ABSTRACT

Anti-Jackknife design for combination with conventional tractor-drawn trailers wherein the tractor includes a rearwardly disposed fifth wheel assembly unit having a skid-plate permitting conventional removable pivotal association with the trailer as through an upright kingpin. The anti-jackknife design comprises at least one vertically reciprocatable locking-pin attached to the skid-plate and located radially outwardly from the kingpin site, actuation controls located on the tractor remote of the fifth wheel unit causing the locking-pin movement between a downward normal-station and an upward extended-station, and horizontally sectorially extending confinement slots on the trailer and effectively engageable with the underlying locking-pin at upward extended-station only thereby resisting trailer jackknifing about the king-pin pivot-axis whenever the tractor operator exercises control of the locking-pin during a potentially jackknifing panic situation.

6 Claims, 7 Drawing Figures

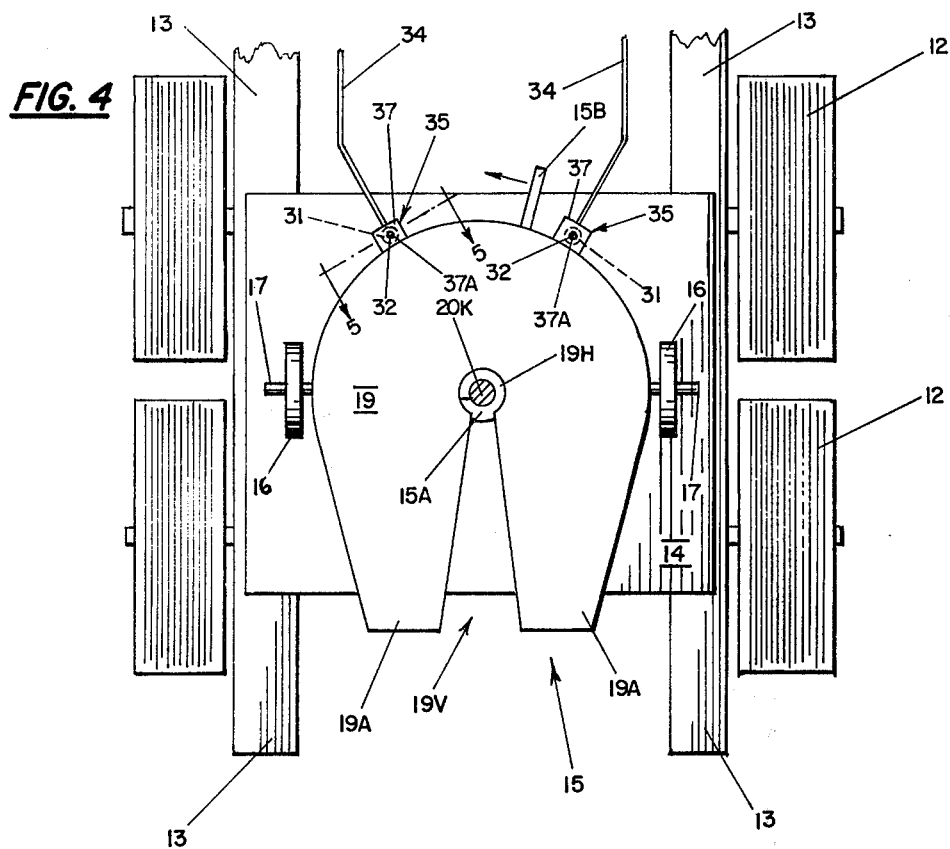

TRAILER ANTI-JACKKNIFING DEVICE

Tractor-drawn trailers conventionally employed in the overland trucking industry utilize an upright kingpin as the removable pivotal connection which defines the vertical pivot-axis between the tractor and trailer. Self-propelled overland tractors traditionally include a forwardly disposed operator's cab and also a rearwardly disposed fifth wheel assembly unit having a generally horizontal skid-plate tiltably mounted on a trunnion. The skid-plate is normally for the most part flat and circular, but along its rearward area it is bifurcated and diverted as a pair of guide lugs to form the sides of a V-shaped entrance slot for the kingpin which ordinarily integrally depends from the trailer frontal baseplate. The tractor fifth wheel unit also includes a latching arrangement for removably pivotably securing the kingpin. Thus, there is provided a removable pivotal connection between the tractor and trailer and with such freedom about the vertical pivot-axis that the tractor-drawn trailer vehicle is able to negotiate sharp corners.

In the overland trucking industry, the "jackknife" condition describes the inadvertent gross misalignment of the longitudinally extending trailer about its vertical pivot-axis connection which is normally brought on by improper application of the brakes while moving at some substantial speed. The jackknife condition frequently leads to a disastrous loss of control which is a particular problem when the vehicular roadway is slick from rain or ice. Prior art workers have attempted to develop jackknife prevention means which are intended to be controllably actuated by the vehicle operator from the tractor cab in panic situations i.e. whenever his application of the vehicle brakes causes the trailer to pivot too rapidly about the vertical pivot-axis. For example, in such panic situations, the trailer must be prevented from pivoting more than about 5°–15° about the pivot-axis lest the momentum of the swerving trailer becomes practically unstoppable to slam broadside against the tractor cab. Accordingly, prior art workers have recognized the necessity for trailer jackknife resistance means that become effective substantially within the 5°–10° range and controllably actuatable from the tractor cab by the vehicle operator. However, prior art anti-jackknifing devices tend to be unreliable or expensive for one reason or another or more appropriate to original equipment form rather than as readily installable addendum accessory for existing tractor-trailer vehicles.

It is accordingly the general object of the present invention to provide improved jackknife resistance means for tractor-drawn trailer vehicles and which is exceedingly reliable and of such inexpensive construction that it is admirably suited as a readily installable addendum accessory for existing vehicles.

Ancillary general objects of the present invention include the provision of anti-jackknife devices which are controllably actuatable by the vehicle operator from within the tractor cab during panic driving situations and before the swerving pivotal trailer has become misaligned by about 10°, the pivot limiting means being unusually reliable both in its actuatability and in its physical strength to resist the momentum of the swerving trailer.

With the above and other objects and advantages in view, which will become more apparent as this description proceeds, the trailer anti-jackknifing means of the present invention generally comprises: at least one (and preferably two) vertically reciprocable locking-pin attached to the tractor fifth wheel unit (and preferably at the skid-plate periphery) and located radially outwardly from the tractor-to-trailer vertical pivot-axis, said locking-pin being preferably vertically reciprocatably fluid-actuated between a a downward normal-station and an upward extended-station, actuation means controllable from the tractor cab for causing the locking-pin to reciprocate between its two stations, locking-pin confinement means on the trailer frontal-underside portion and extending finitely horizontally sectorially about the vertical pivot-axis and engageable with the locking-pin at upward extended-station but not at downward normal-station thereby preventing the trailer during panic situations from swerving more than about 10° or so.

In the drawing, wherein like characters refer to like parts in the several views, and in which:

FIG. 4 is a sectional plan view (looking downwardly) taken along line 4—4 of FIG. 2.

Figure 1:
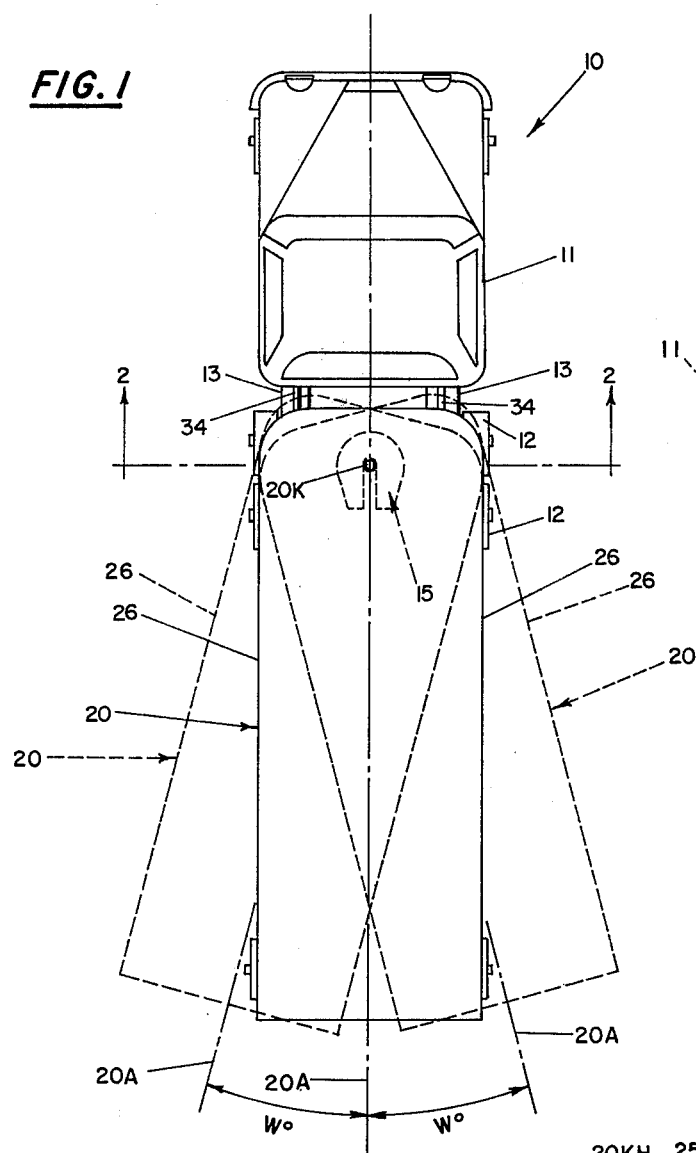
FIG. 1 is a top plan view of a typical tractor-drawn trailer vehicular combination having a representative embodiment of anti-jackknifing device of the present invention (obscured in FIG. 1 by the overlying trailer).
Figure 7:
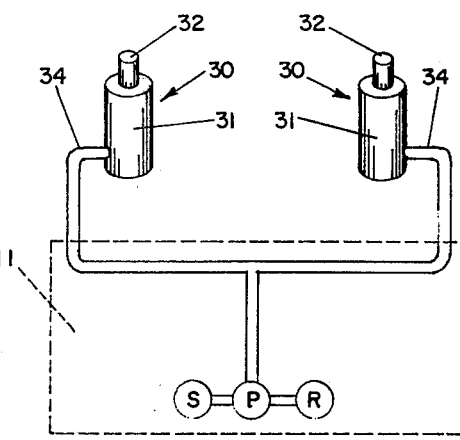
FIG. 7 is a schematic view directed to the plunger locking-pins and the piston actuation means therefor.

Referring now to the drawings, FIG. 1 designates a top plan view of a self-propelled tractor 10 removably pivotably attached along a vertical pivot-axis to a longitudinally rearwardly extending trailer 20, as through an upright kingpin 20K. Conventional tractor 10 includes a forwardly disposed operator's cab 11 and a set of rear drive wheels 12 which support the rear end of a chassis composed of a pair of longitudinal horizontal beam members 13. Mounted on the chassis 13 between the rear drive wheels 12 is a fifth wheel assembly or unit 15 for removably pivotably coupling trailer 20 to tractor 10. The trailer 20 has on its frontal underside the usual sturdy horizontal base-plate 21, which rests upon the fifth wheel unit 15 (at skid-plate 19) when the tractor 10 and trailer 20 are coupled. Herein, trailer 20 has a kingpin 20K which projects rigidly downwardly from base-plate 21 and into fifth wheel assembly 15 for removably pivotably connecting the front of trailer 20 to the rear of tractor 10. The fifth wheel assembly 15 includes a horizontal rest-plate 14 which rests upon and is attached to the longitudinal chassis beams 13 generally between the tractor rear wheels 12. At its sides, rest-plate 14 has integrally attached thereto a pair of upright trunnion-brackets 16 receiving and confining the ends of a horizontal trunnion shaft 17 which extends between them. The trunnion (i.e. shaft 17) in turn serves as a journal for a pair of triangular side-brackets 18 integrally depending from skid-plate 19.

The fifth wheel assembly skid-plate (19) portion possesses the conventional skid-plate configuration (seen in FIG. 4), that is, for the most part is flat and circular, but along its rearwardly disposed end is bifurcated and diverted away from the circular shape in the formation of a pair of rearwardly projecting guide-lugs 19A. The opposed inwardly presented surfaces of guide-lugs 19A diverge away from each other and form the sides of a V-shaped entrance slot 19V leading into the center of skid-plate 19 where it opens into a circular hole 19H sized slightly larger than kingpin 20K. Removable pivotal connection between the depending kingpin 20K component of trailer 20-21 and fifth wheel assembly 15 is effected through a latch-lug 15A which is manually engageable and disengageable from kingpin 20K with lever 15B that forwardly underlies skid-plate 19.

Thus, removable pivotal attachment between the fifth wheel assembly 15 of tractor 10 and trailer kingpin 20K allows the trailer 20 to pivot in both directions of the tractor-trailer vertical pivot-axis (e.g. at 20K). For example, FIG. 1 solid line indicates the trailer longitudinal central-axis 20A extending along a vertical-plane collinear with tractor 10, phantom lines indicating the trailer 20 pivotal conditions about kingpin 20K. In certain panic situations, evidencing potential jackknifing as indicated in FIG. 1 phantom lines, the trailer central-axis 20A should not be allowed to deviate more than "W"° about kingpin pivot-axis 20K, the numerical value of W° being typically within the range of some 5° to 10°, and substantially some 10°. Within these angular values, disastrous jackknifing situations might ordinarily be avoided.

Figure 3:
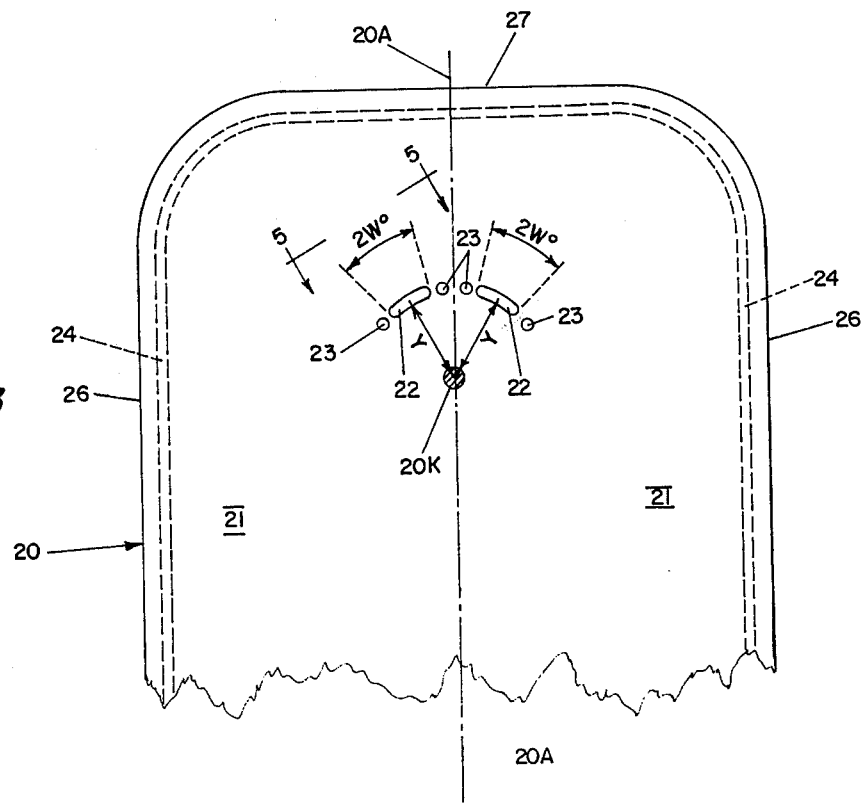
FIG. 3 is a sectional plan view (looking upwardly) taken along line 3—3 of FIG. 2.

It is the general purpose of the present invention to provide anti-jackknifing means for combination with tractor-trailer type vehicles whereby the trailer central-axis 20A is not allowed to deviate more than an arbitrarily prescribed W° angular value with respect to the pivot-axis (e.g. kingpin 20K). The W° angular value is within the range of 5°-15°, and preferably about 10° which is consistent with manageable trailer momentums during swerving. As will be hereinafter pointed out in greater detail, the anti-jackknifing means comprises at least one vertically reciprocatable locking-pin 32 attached to the fifth wheel assembly 15 radially outwardly of kingpin 20K which locking-pin is remotely controllabley actuatable from the tractor cab (11) and engageable with appropriate confinement means attached to the trailer base-plate 21 and extending horizontally sectorially about the pivot-axis e.g. kingpin 20K. For example, as seen in FIG. 3, the trailer underside frontal base-plate 21 itself includes at least one upwardly arcuately sectorially slotted portion 22 having a constant-radius Y from and a finite arcuate extent of twice-W° with respect to kingpin 20K. The vertically reciprocatable locking-pin 32 has a normal-station located downwardly below the confinement means (21-22) and an upward extendedstation located within the confinement means. Thus, locking-pin 32 is adapted to abut the two respective terminii of the sectorial confinement means (e.g. 21-22) to maintain trailer 20-20A within an angle of the selected W° value. Of course, the locking-pin would be located substantially midway the two terminii of sectorial confinement 22 whenever trailer 20 extends truly longitudinally of tractor 10 as indicated in FIG. 1 solid line position e.g. for 20A.

Figure 2:
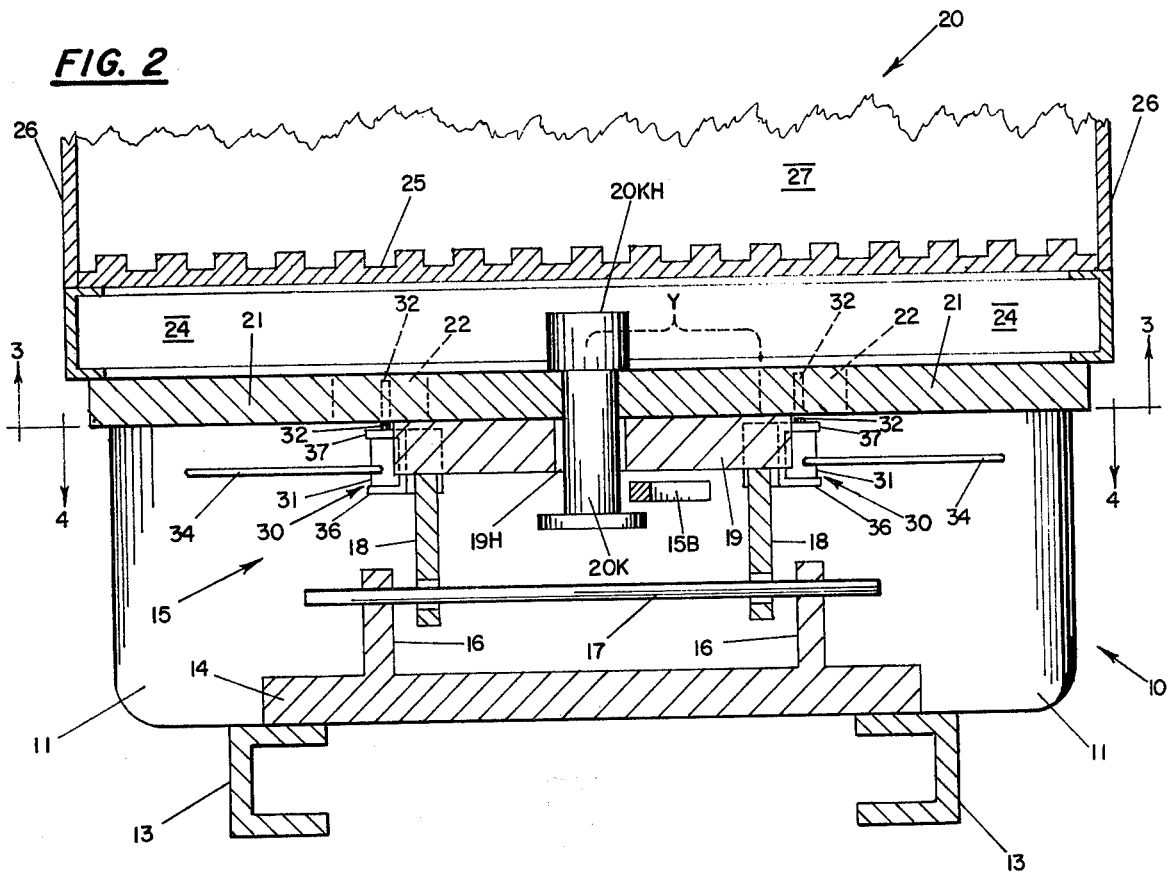
FIG. 2 is a sectional elevational view (looking forwardly) taken through the tractor-to-trailer vertical pivot-axis and along line 2—2 of FIG. 1.

Trailer 20 is of representative conventional construction including a horizontal channel-iron means 24 along the trailer periphery and to which horizontal base-plate 21 is attached. Horizontal decking 25 rests upon the channel-iron 24 and provides an internal floor for trailer 20, there being a spatial gap between the horizontal member 24 and 25. The trailer upright walls include longitudinally extending planar side-walls 26 and curved front-wall 27 which are attached to and extend uprightly from channel-iron 24. As best seen in FIG. 2, arcuate sectorial slots 22 and kingpin 20K extend entirely upwardly through base-plate 21, kingpin 20K having an enlarged head 20KH integrally attached to base-plate 21.

Figure 6:
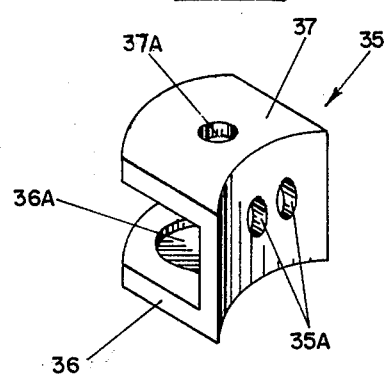
FIG. 6 is a perspective view of the preferred type support for the locking-pin piston support means at the skid-plate.
Figure 5:
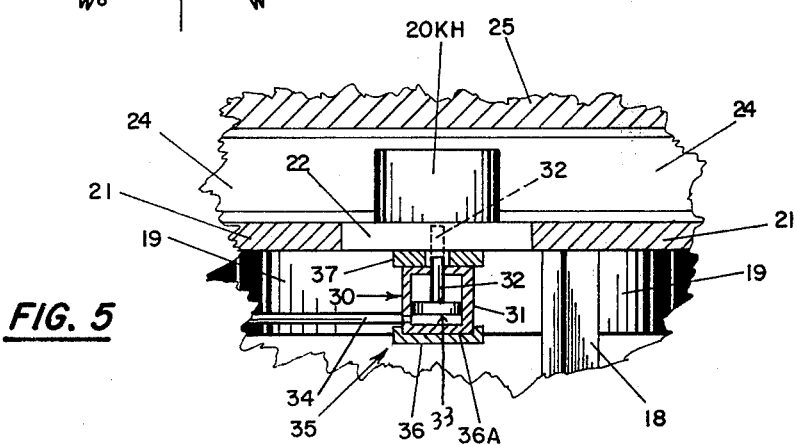
FIG. 5 is a sectional elevational view taken through line 5—5 of FIG. 4.

As had previously been alluded to, there is a vertically reciprocatable locking-pin e.g. upright member 32, attached to the fifth wheel unit 15 in substantial vertical registry with the horizontally sectorially extending confinement means e.g. 22. Herein, the locking-pin 32 is the reciprocatable plunger portion of a hyraulically actuatable piston 30 typically comprising a cylindrically tubular casing 31 and the piston plunger 32 including an enlarged head 33 slidably positioned within casing 31. Vertical reciprocation of the plunger 32-33 is afforded through liquid or air fluid forceably introduced into the interior of casing 31 as through the hoses 34. Herein, the piston unit 30 is preferably removably mounted as an addendum to the major periphery of a typical skid-plate 19 as with the C-shaped support 35 shown in FIG. 6 having holes 35A for permitting bolts (not shown) to attach the concave side of support 35 to the skid-plate convex periphery. The lower shelf 36 of support 35 is provided with recess 36A to support the lower end of casing 31, while the support upper shelf 37 is apertured at 37A to permit passage therethrough of plunger locking-pin 32. The presence of upper shelf 37 around locking-pin 32 protects its portions located within casing 31 (e.g. head 33) from damage whenever locking-pin 32 slams against a terminus of the confinement means (e.g. 22) during a panic stop situation. Because of the weighty swerving trailer (20), the use of two mating sets of locking-pins (32) and sectorial confinement means (22) is preferred and will provide an extra margin of structural strength. As was previously alluded to, kingpin 20K is somewhat loosely accommodated within skid-plate hole 19H, and thus, the regular transverse width of each arcuate slot 22 is necessarily somewhat wider than the diameter of locking-pin 32. As best seen in FIG. 3, there might be a pair of circular safety-holes 23 in the trailer base-plate 21 located said same constant-radius Y of kingpin 20K as for slot 22. If the tractor operator waits too long in controllably actuating the pistons 30 to engage locking-pin(s) 32 within arcuate sectorial confinements 22, the safety-holes 23 are apt to engage a locking-pin (32). However, by virtue of the non-elongated circularity of safety-holes 23, and spaced at more than a W°-angle, locking-pins 32 are prevented from engaging same unless the speed of a swerving trailer is relatively low, thereby preventing damage to the piston plunger 32-33.

Operation of the anti-jackknifing means, although having already been alluded to, might be summarized as follows. There is a reservoir "R" of suitable hydraulic fluid such as oil for forceable introduction into the piston casing(s) 31 through hoses 34 whereby locking-pins 32-33 might be reciprocated. The pump P is actuated through an appropriate control switch means located remote of pistons 30, as with electrical switches S located inside the operator's cab 11. Thus, whenever the tractor operator senses while driving a panic situation wherein trailer 20 begins to swerve or jackknife about the pivot-axis (20K), he actuates control switch S to start pump P. This forces hydraulic fluid from reservoir R via hoses 34 into piston casings 31 to move each locking-pin 32 from the downward normal-station (solid lines) to the upward extended-station (phantom lines) to engage registry within a sectorial confinement means (22). Accordingly, the trailer (20) is prevented from jackknifing or swerving past the arbitrarily set W° value, which is preferably about 10°.

From the foregoing, the construction and operation of the anti-jackknifing device and means of the present invention will be readily understood and further explanation is believed to be unnecessary. However, since numerous modification and changes will readily occur to those skilled in the art, it is not desired to limit the invention to the exact constructions shown and described, and accordingly, all suitable modifications and equivalents may be resorted to, falling within the scope of the appended claims.

We claim:

1. Trailer anti-jackknifing device in combination with a conventional tractor-drawn trailer wherein the tractor includes a forwardly disposed operator's cab and rearwardly disposed fifth wheel assembly unit having a skid-plate that includes a generally circular forward major portion and a bifurcate rearward minor portion and including therewithin a kingpin extending along the tractor-trailer vertical pivot-axis, the trailer underside including a frontal base-plate having a depending kingpin overlying the fifth wheel unit skid-plate bifurcate portion, and the trailer extending longitudinally rearwardly from and in pivotably associated relationship with the tractor through said kingpin vertical pivot-axis, said anti-jackknifing device comprising:

A. At least one vertically reciprocatable upright locking-pin as the reciprocatably movable plunger of a fluid-actuatable piston of the casing-plunger type, the stationary casing portion of the piston nestably supported within the recess lower horizontal shelf of a generally C-shaped support member and the plunger locking-pin portion of the piston being surrounded by the upper horizontal shelf of said C-shaped support member, the locking-pin being ultimately attached to the fifth wheel skid-plate by removably abuttably attaching the C-shaped support upright intermediate concave portion to the skid-plate generally circular forward peripheral portion, said plunger locking-pin having a lower normal-station located wholly downwardly below the trailer base-plate and an upward extended-station;

B. Actuation means for causing the plunger locking-pin to vertically reciprocate between said lower normal-station and said upward extended-station, said locking-pin actuation means including a control means located within the operator's cab and hence remote from the tractor fifth wheel unit skid-plate; and C. Sectorially extending confinement means for the locking-pin and effective at extended-station only thereby preventing trailer jackknifing about the tractor-trailer vertical-axis during panic situations but not interfering with sharp tractor turns during normal driving, said horizontal sectorial confinement means having a continuous sectorial extent within the range of 15°–25° and being attached to the trailer frontal base-plate and located radially outwardly from the tractor-trailer vertical pivot-axis and in common elevation with the locking-pin upward extended-station, the confinement means central portion being in registry with the locking-pin when the pivotal trailer is in rearwardly longitudinally extending relationship with the tractor fifth wheel unit and the kingpin pivot-axis thereat and wherein the trailer base-plate in addition to the sectorial confinement means and spaced from the respective terminii thereof includes at least two safety-holes spaced a constant-radius from the kingpin pivot-axis.

2. The anti-jackknife device of claim 1 wherein there is a pair of said fluid-actuated pistons and removably peripherally attached to the skid-plate on opposite sides of an imaginary vertical-plane passing through the kingpin and along the skid-plate longitudinal entrance slot; wherein a single control means located within the tractor operator's cab is capable of actuating both fluid-type pistons simultaneously; and wherein there is a pair of sectorial confinement means on the trailer base-plate for receiving the respective piston plunger locking-pins at upward extended-stations.

3. The anti-jackknife device of claim 2 wherein the sectorially extending confinement means comprises slotted portions at the trailer base-plate underside.

4. The anti-jackknife device of claim 3 wherein the sectorially extending slotted confinement means is arcuately shaped and spaced a constant-radius from the kingpin and entirely upwardly through the trailer base-plate, the trailer comprising an internal horizontal decking located above the base-plate; wherein the base-plate additionally includes at least two safety-holes spaced said constant-radius from the kingpin; and wherein the diameter of the plunger locking-pin is less than the transverse width of the sectorial base-plate slots.

5. The anti-jackknife device of claim 1 wherein the sectorially extending confinement means comprises arcuately slotted portions at the trailer base-plate underside, said arcuately slotted portion being spaced a constant-radius from the kingpin pivot-axis and having a substantially regular transverse width; and wherein the diameter of the plunger locking-pin is less than the arcuately slotted confinement means transverse width to compensate for the loose connection between kingpin and fifth wheel unit.

6. The anti-jacknifing device of claim 5 wherein the C-shaped support upright intermediate portion is concave for abutment against the skid-plate circular forward peripheral portion and is provided with holes permitting removable addendum attachment thereat; wherein the C-shaped support lower horizontal shelf is provided with a recess to nestably support the stationary casing therewithin; and wherein the trailer base-plate in addition to the sectorial confinement means includes at least two safety-holes spaced said constant-radius from the kingpin vertical pivot-axis.

* * * * *